(12) United States Patent
Jiang

(10) Patent No.: US 11,148,483 B2
(45) Date of Patent: Oct. 19, 2021

(54) TIRE DISASSEMBLY AND ASSEMBLY BOOSTER ARM DEVICE

(71) Applicant: YINGKOU LIAONAN DEVI MACHINERY EQUIPMENT CO., LTD, Yingkou (CN)

(72) Inventor: Guilin Jiang, Liaoning (CN)

(73) Assignee: YINGKOU LIAONAN DEVI MACHINERY EQUIPMENT CO., LTD, Yingkou (CN)

(*) Notice: Subject to any disclaimer, the term of this patent is extended or adjusted under 35 U.S.C. 154(b) by 519 days.

(21) Appl. No.: 16/197,634

(22) Filed: Nov. 21, 2018

(65) Prior Publication Data
US 2019/0152279 A1 May 23, 2019

(30) Foreign Application Priority Data
Nov. 22, 2017 (CN) .......................... 201711172936.2

(51) Int. Cl.
  *B60C 25/138* (2006.01)
  *B60C 25/05* (2006.01)
(52) U.S. Cl.
  CPC ........ *B60C 25/138* (2013.01); *B60C 25/0545* (2013.01)
(58) Field of Classification Search
  CPC ..... B60C 25/132; B60C 25/138; B60C 25/13; B60C 25/135; B60C 25/0527; B60C 25/0545; B60C 25/0563; B60C 25/059
  See application file for complete search history.

(56) References Cited

U.S. PATENT DOCUMENTS

| 6,182,736 B1 * | 2/2001 | Cunningham ........ B60C 25/135 |
| | | 157/1.17 |
| 9,944,136 B2 * | 4/2018 | Bonacini ............... B60C 25/138 |

FOREIGN PATENT DOCUMENTS

CN  106183665 A  * 12/2016
CN  205930066 U  *  2/2017

* cited by examiner

*Primary Examiner* — Bryan R Muller
(74) *Attorney, Agent, or Firm* — Garvey, Smith & Nehrbass, Patent Attorneys, L.L.C.; Vanessa M. D'Souza; Seth M. Nehrbass

(57) ABSTRACT

The present invention discloses a tire disassembly and assembly booster arm device installed on an upright of a tire disassembly and assembly machine. The tire disassembly and assembly booster arm device includes a first tire pressing arm and a second tire pressing arm. A first polished shaft and a second polished shaft are symmetrically arranged on two sides of the upright. An air cylinder hanging frame is installed on the top surface of the upright, and an air cylinder is suspended on the air cylinder hanging frame. One end of a piston rod of the air cylinder is connected to a sliding frame connecting frame. A first sliding frame is connected to the first polished shaft in a sliding mode. The front end of the first sliding frame is hinged to the first tire pressing arm, and the rear end of the first sliding frame is connected to one side of the sliding frame connecting frame. A second sliding frame is connected to the second polished shaft in a sliding mode. The front end of the second sliding frame is hinged to the second tire pressing arm, and the rear end of the second sliding frame is hinged to the other side of the sliding frame connecting frame. The tire disassembly and assembly booster arm device may drive the first tire pressing arm and the second tire pressing arm to descend at the same time, so that a tire is pressed to be separated from a hub, which has convenient operations, realizes an assisting mode of one (Continued)

cylinder with two arms, and has the advantages of simple structure, easy for disassembly and assembly, improves work efficiency, and reduces manufacturing and transportation cost.

16 Claims, 4 Drawing Sheets

TIRE DISASSEMBLY AND ASSEMBLY BOOSTER ARM DEVICE

This application claims priority to Chinese patent application number 201711172936.2, filed Nov. 22, 2017, with a title of TIRE DISASSEMBLY AND ASSEMBLY BOOSTER ARM DEVICE. The above-mentioned patent application is incorporated herein by reference in its entirety.

TECHNICAL FIELD

The present invention relates to the field of tire disassembly and assembly technologies, and in particular, to a tire disassembly and assembly booster arm device.

BACKGROUND

A conventional tire disassembly and assembly machine usually has a booster arm on a swing arm, on a column lug, on both sides of a main box, and each support arm is correspondingly provided with one cylinder and one valve. Not only is the structure complicated and the occupied space large, but because the left and right booster arms cannot be adjusted at the same time, each time an explosion-proof tire is utilized, the heights of the two booster arms need to be separately manually adjusted—an inconvenient operation wherein labor is wasted.

There is another installation manner of a booster arm: wherein a sliding board is added behind the upright of the tire disassembly and assembly machine, slide blocks are added on two sides of the sliding board, and a booster arm frame needs to be installed on the outside of the sliding block, and the upright is added to the rear layer, so that the air cylinder can only be installed on the host. Although the two booster arms can work at the same time, the device is too bulky and increases the manufacturing cost, is inconvenient to operate, reduces work efficiency, and the transportation cost is too high due to the complicated structure and the inability to disassemble.

SUMMARY

To solve the above problems, the present invention provides a tire disassembly and assembly booster arm device with a simple structure, small volume, convenient installation and simultaneous adjustment and use of two arms.

To achieve the above objectives, the present invention provides the following solutions.

The present invention provides a tire disassembly and assembly booster arm device, and the tire disassembly and assembly booster arm device is installed on an upright of a tire disassembly and assembly machine. The tire disassembly and assembly booster arm device includes a first tire pressing arm and a second tire pressing arm. A first polished shaft and a second polished shaft are symmetrically arranged on two sides of the upright. An air cylinder hanging frame is installed on the top surface of the upright, and an air cylinder is suspended on the air cylinder hanging frame. One end of a piston rod of the air cylinder is connected to a sliding frame connecting frame. A first sliding frame is connected to the first polished shaft in a sliding mode. The front end of the first sliding frame is hinged to the first tire pressing arm, and the rear end of the first sliding frame is connected to one side of the sliding frame connecting frame. A second sliding frame is connected to the second polished shaft in a sliding mode. The front end of the second sliding frame is hinged to the second tire pressing arm, and the rear end of the second sliding frame is hinged to the other side of the sliding frame connecting frame.

Optionally, the first tire pressing arm includes a front tire pressing arm and a rear tire pressing rotation arm; the rear end of the rear tire pressing rotation arm is hinged to the front end of the first sliding frame, the front end of the rear tire pressing rotation arm is hinged to the rear end of the front tire pressing arm, and a tire pressing module is installed on the front end of the front tire pressing arm.

Optionally, the second tire pressing arm is of a single-arm structure, a pneumatic valve switch is installed on one side of the second tire pressing arm, and the pneumatic valve switch controls stretching of the piston rod.

Optionally, the rear end of the second tire pressing arm is hinged to the front end of the second sliding frame; an adjustment board is provided on the second sliding frame, and a positioning bolt is connected inside the adjustment board in a threaded manner; the positioning bolt is rotated, and one end of the positioning bolt contacts a baffle fixed on the second tire pressing arm and pushes the second tire pressing arm to rotate; and a tire pressing roller is provided on the front end of the second tire pressing arm.

Optionally, a first upper shaft base and a first lower shaft base are provided on an outer side wall of the upright; the top end of the first polished shaft is connected to the first upper shaft base in a detachable manner, the bottom of the first polished shaft is connected to the first lower shaft base in a detachable manner, and an axis of the first polished shaft is parallel to that of the upright.

Optionally, a second upper shaft base and a second lower shaft base are also provided on the outer side wall of the upright; the top end of the second polished shaft is connected to the second upper shaft base in a detachable manner, the bottom end of the second polished shaft is connected to the second lower shaft base in a detachable manner, and an axis of the second polished shaft is parallel to that of the upright.

Optionally, a length of the first polished shaft is equal to that of the second polished shaft, and the axis of the first polished shaft, the axis of the second polished shaft, and the axis of the upright are on a same plane.

Optionally, the first upper shaft base, the first lower shaft base, the second upper shaft base, and the second lower shaft base are one-step formed with the upright.

Optionally, the present invention further provides a tire disassembly and assembly machine, including an upright and a tire disassembly and assembly booster arm device; the tire disassembly and assembly booster arm device is installed on the upright, and a disassembly and assembly head is also installed on the upright.

As compared with the prior art, the present invention achieves the following technical results.

The present invention provides a tire disassembly and assembly booster arm device and a tire disassembly and assembly machine, the tire disassembly and assembly booster arm device is installed on the upright, and is connected to a sliding frame connecting frame via a piston rod of an air cylinder; two ends of the sliding frame connecting frame are respectively connected to a first sliding frame and a second sliding frame; the first sliding frame and the second sliding frame are respectively connected to the first polished shaft and the second polished shaft in a sliding manner. The pneumatic valve switch may be started to drive the first tire pressing arm and the second tire pressing arm to descend at the same time, so that a tire is pressed to be separated from a hub; especially when a tire is installed, the first tire pressing arm and the second tire pressing arm are pressed at the same time, the second tire pressing arm can be automatically positioned by adjusting the positioning bolt, and the first tire pressing arm can press the tire against the inside of the hub along with the tire rotation, and tire installation can be completed without the disassembly and assembly head. The operation is simple, the two arms are linked to realize the assisting mode of one cylinder with two arms, and the problem of manually adjusting the height of the two tire pressing arms separately is avoided when an explosion-proof tire is installed, the operation is convenient, and the work efficiency is improved. Moreover, the tire disassembly and assembly booster arm device and the tire disassembly and assembly machine have simple structures and are easy to disassemble and assemble, which reduces manufacturing and transportation costs.

BRIEF DESCRIPTION OF THE DRAWING

In order to more clearly illustrate preferred embodiments of the present invention or the technical solutions in the prior art, the drawings corresponding to such embodiments will be briefly described below. Obviously, the drawings in the following description are only some which could depict certain preferred embodiments of the present invention. For the preferred embodiments, other drawings may be obtained from those skilled in the art without any inventive labor.

DETAILED DESCRIPTION

Figure 1:
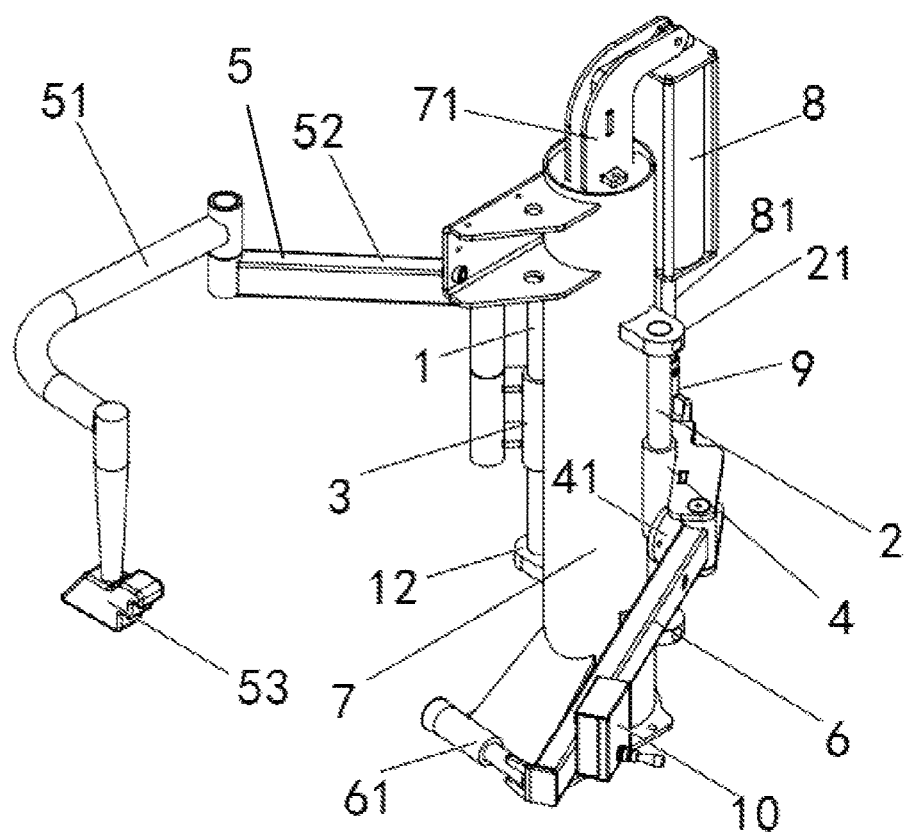
FIG. 1 is a main view of a tire disassembly and assembly booster arm device.

The technical solutions of preferred embodiments of the present invention are described herein with reference to accompanying drawings of certain embodiments of the present invention. It is obvious that the described embodiments are only some of the embodiments of the present invention and not all embodiments. All other embodiments obtained by those skilled in the art based on the disclosed embodiments of the present invention without creative efforts are within the scope of the present invention.

An objective of the present invention is to provide a tire disassembly and assembly booster arm device which is simple in structure, small in size, convenient in installation, and capable of simultaneously adjusting both arms.

The present invention provides a tire disassembly and assembly booster arm device. The tire disassembly and assembly booster arm device is installed on an upright of a tire disassembly and assembly machine. The tire disassembly and assembly booster arm device includes a first tire pressing arm and a second tire pressing arm. A first polished shaft and a second polished shaft are symmetrically arranged on two sides of the upright. An air cylinder hanging frame is installed on the top surface of the upright, and an air cylinder is suspended on the air cylinder hanging frame. One end of a piston rod of the air cylinder is connected to a sliding frame connecting frame. A first sliding frame is connected to the first polished shaft in a sliding mode. The front end of the first sliding frame is hinged to the first tire pressing arm, and the rear end of the first sliding frame is connected to one side of the sliding frame connecting frame. A second sliding frame is connected to the second polished shaft in a sliding mode. The front end of the second sliding frame is hinged to the second tire pressing arm, and the rear end of the second sliding frame is hinged to the other side of the sliding frame connecting frame.

A tire disassembly and assembly booster arm device is installed on an upright of a tire disassembly and assembly machine and is connected to a sliding frame connecting frame by means of a piston rod of the air cylinder; two ends of the sliding frame connecting frame are respectively connected to a first sliding frame and a second sliding frame; moreover, the first sliding frame and the second sliding frame are respectively connected to a first polished shaft and a second polished shaft in a sliding manner. A pneumatic valve switch may be started to drive the first tire pressing arm and the second tire pressing arm to descend at the same time so that a tire is pressed to be separated from a hub. The operation is simple; the two arms are linked to realize the assisting mode of one cylinder with two arms; the problem of manually adjusting the height of the two tire pressing arms separately is avoided when an explosion-proof tire is installed; the operation is convenient; and, the work efficiency is improved. Moreover, the tire disassembly and assembly booster arm device and the tire disassembly and assembly machine have simple structures and are easy to disassemble and assemble, which reduces manufacturing cost and transportation cost.

The present invention will be further described in detail with reference to the drawings and specific embodiments.

Preferred Embodiment 1

This preferred embodiment describes a tire disassembly and assembly booster arm device. As shown in FIG. 1, the tire disassembly and assembly booster arm device is installed on an upright 7 of the tire disassembly and assembly machine. The tire disassembly and assembly booster arm device includes a first tire pressing arm 5 and a second tire pressing arm 6. A first polished shaft 1 and a second polished shaft 2 are symmetrically arranged on two sides of the upright 7. An air cylinder hanging frame 71 is installed on the top surface of the upright 7, and an air cylinder 8 is suspended on the air cylinder hanging frame 71. One end of a piston rod 81 of the air cylinder 8 is connected to a sliding frame connecting frame 9. A first sliding frame 3 is connected to the first polished shaft 1 in a sliding mode. The front end of the first sliding frame 3 is hinged to the first tire pressing arm 5, and the rear end of the first sliding frame 3 is connected to one side of the sliding frame connecting frame 9. A second sliding frame 4 is connected to the second polished shaft 2 in a sliding mode. The front end of the second sliding frame 4 is hinged to the second tire pressing arm 6, and the rear end of the second sliding frame 4 is hinged to the other side of the sliding frame connecting frame 9.

Figure 2:
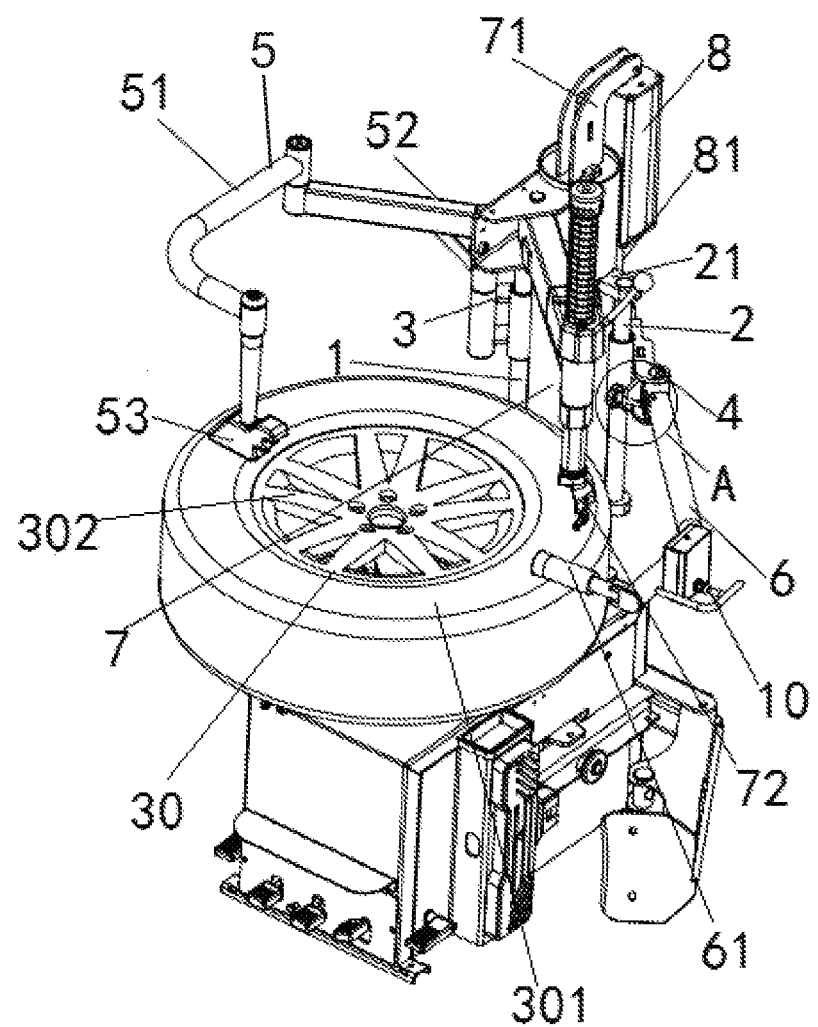
FIG. 2 is a schematic structural diagram of the tire disassembly and assembly machine based on the tire disassembly and assembly booster arm device in FIG. 1.

In this preferred embodiment, as shown in FIG. 1 and FIG. 2, the first tire pressing arm 5 is of a two-section arm structure, including a front tire pressing arm 51 and a rear tire pressing rotation arm 52. The rear end of the rear tire pressing rotation arm 52 is hinged to the front end of a first sliding frame 3 by means of a rotation shaft; the front end of the rear tire pressing rotation arm 52 is hinged to the rear end of the front tire pressing arm 51 by a same rotation shaft, and the front tire pressing arm 51 is located above the rear tire pressing rotation arm 52. As shown in FIG. 1, the front end of the front tire pressing arm 51 is in a corner shape, and a tire pressing module 53 is installed on the front end of the front tire pressing arm 51. Correspondingly, as shown in FIGS. 1 and 2, the second tire pressing arm 6 is of a single-arm structure; a pneumatic valve switch 10 is installed on one side of the second tire pressing arm 6, and the pneumatic valve switch 10 is used to control a piston rod 81 to stretch in the air cylinder 8.

Figure 3:
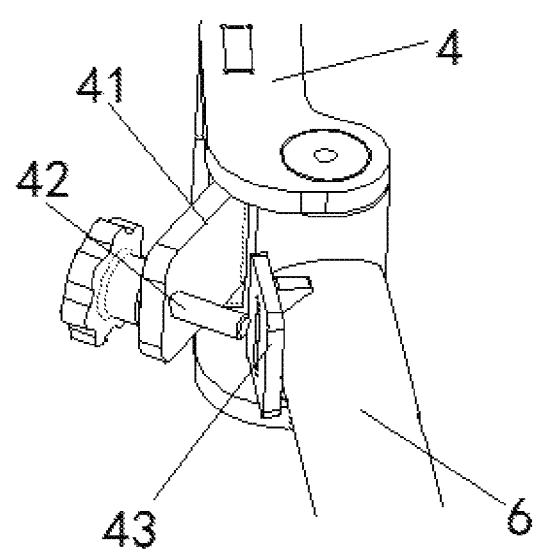
FIG. 3 is an enlarged diagram of A in FIG. 2.

Further, as shown in FIG. 3, the rear end of the second tire pressing arm 6 is hinged to the front end of the second sliding frame 4 by means of a rotation shaft. An adjustment board 41 is provided extending along the second sliding frame 4. A threaded hole is provided on the adjustment board 41, and a positioning bolt 42 matched to the inner thread is connected inside the threaded hole. Meanwhile, as shown in FIG. 3, a baffle 43 is provided on the rear root part of the second tire pressing arm 6. When the positioning bolt 42 is rotated, one end of the positioning bolt 42 can contact the baffle 43 on the second tire pressing arm 6, and continuing rotating the positioning bolt 42 may push the second tire pressing arm 6 to rotate, so as to realize exact adjustment of the position of the second tire pressing arm 6 to adapt tires with different sizes. A tire pressing roller 61 is provided on the front end of the second tire pressing arm 6. As shown in FIG. 1 and FIG. 2, the tire pressing roller 61 and the second tire pressing arm 6 may be rotatably connected, and the tire pressing roller 61 and the tire pressing module 53 are always on a same horizontal plane.

Figure 4:
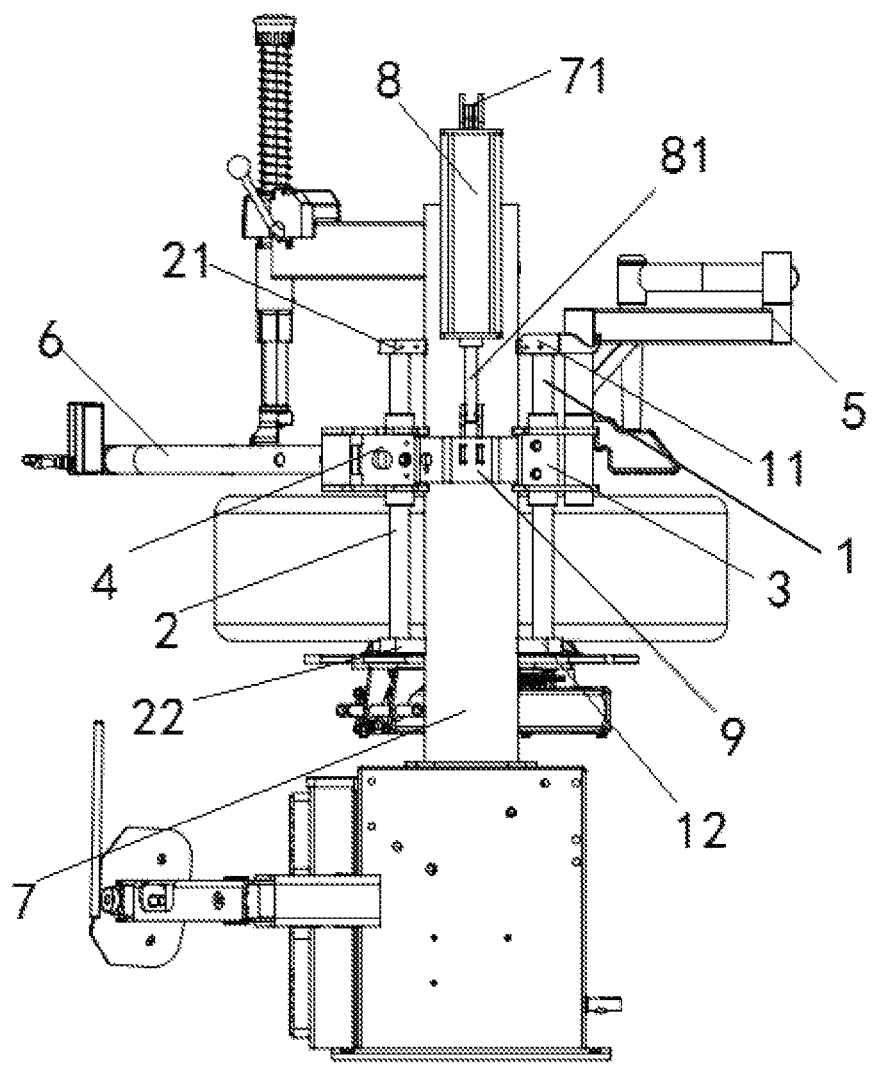
FIG. 4 is a rear view of the tire disassembly and assembly machine in FIG. 2.

Further, as shown in FIG. 1, FIG. 2, and FIG. 4, a first upper shaft base 11 and a first lower shaft base 12 are provided on an outer side wall of the upright 7; the top end of the first polished shaft 1 is connected to the first upper shaft base 11 in a detachable manner, the bottom of the first polished shaft 1 is connected to the first lower shaft base 12 in a detachable manner, and an axis of the first polished shaft 1 is parallel to an axis of the upright 7. Correspondingly, as shown in FIG. 1, FIG. 2, and FIG. 4, a second upper shaft base 21 and a second lower shaft base 22 are provided on the outer side wall of the upright 7. The top end of the second polished shaft 2 is connected to the second upper shaft base 21 in a detachable manner, the bottom of the second polished shaft 2 is connected to the second lower shaft base 22 in a detachable manner, and an axis of the second polished shaft 2 is parallel to an axis of the upright 7. In this embodiment, a length of the first polished shaft 1 is equal to that of the second polished shaft 2; the axis of the first polished shaft 1, the axis of the second polished shaft 2, and the axis of the upright 7 are on a same plane; and the first polished shaft 1 and the second polished shaft 2 are preferably arranged symmetrically at 180°.

Further, the first upper shaft base 11, the first lower shaft base 12, the second upper shaft base 21, and the second lower shaft base 22 are one-step formed or welded with the upright 7.

Use methods of this preferred embodiment are described below.

When the device is used, first a wheel 30 is installed on a rotation plate for positioning. The first tire pressing arm 5 and/or the second tire pressing arm 6 are manually adjusted, so as to make the tire pressing module 53 and the tire pressing roller 61 locate right above a rubber tire 301; then, the pneumatic valve switch 10 is started, and the piston rod 81 descends at the same time and slowly drives the first tire pressing arm 5 and the second tire pressing arm 6 to press the tire pressing roller 61 and the tire pressing module 53 to contact the upper surface of the rubber tire 301. The piston rod 81 continues descending, and the tire pressing roller 61 and the tire pressing module 53 continue pressing to make the rubber tire 301 separate from the hub 302, so that tire disassembly may be completed by disassembling the rubber tire 301 by means of the disassembly and assembly head 72.

Correspondingly, when a tire is assembled, the pneumatic valve switch 10 is first started to make the piston rod 81 descend and slowly drive the first tire pressing arm 5 and the second tire pressing arm 6 to press the tire pressing roller 61 and the tire pressing module 53 to contact the upper surface of the rubber tire 301; at this time, the rubber tire 301 is located right above the hub 302 and in a to-be-assembled state, and the hub 302 is installed on a rotation plate. The positioning bolt 42 is adjusted to adjust the position of the second tire pressing arm 6 and the position of the first tire pressing arm 5 is adjusted to a proper position, then the piston rod 81 continues descending, and the tire pressing roller 61 and the tire pressing module 53 force the rubber tire 301 to partly enter the inside of the hub 302; meanwhile, the rotation plate is started to rotate the hub 302. Along with rotation of the hub 302 and the rubber tire 301, the tire pressing module 53 may directly press the rubber tire 301, which does not enter or engage the side of the hub 302 to enter the inside of the hub 302, which reduces the step of using the disassembly and assembly head 72 to complete tire assembly.

In view of the above, the tire disassembly and assembly booster arm device of this embodiment is installed on the upright 7 of the tire disassembly and assembly machine and is connected to the sliding frame connecting frame 9 by means of the piston rod 81 of the air cylinder 8; moreover, two ends of the sliding frame connecting frame 9 are respectively connected to the first sliding frame 3 and the second sliding frame 4. By means of the sliding connection relationships respectively among the first sliding frame 3, and the second sliding frame 4, the first polished shaft 1 and the second polished shaft 2, the pneumatic valve switch 10 is started to drive the first tire pressing arm 5 and the second tire pressing arm 6 to descend at the same time to press the tire to be separated from the hub. Especially, when a tire is installed, the first tire pressing arm 5 and the second tire pressing arm 6 are pressed at the same time. The second tire pressing arm 6 may be automatically positioned by adjusting the positioning bolt 42. The first tire pressing arm 5 may press the tire to be inside the hub along with the rotation of the tire, and the tire installation may be completed without using the disassembly and assembly head 72. The operation is simple, the two arms are linked to realize the assisting mode of one cylinder with two arms, and the problem of manually adjusting the height of the two tire pressing arms separately is avoided when an explosion-proof tire is installed; the operation is convenient, and the work efficiency is improved. Moreover, the tire disassembly and assembly booster arm device and the tire disassembly and assembly machine have simple structures and are easy to disassemble and assemble, which reduces manufacturing and transportation costs.

Preferred Embodiment 2

This embodiment describes a tire disassembly and assembly machine of the tire disassembly and assembly booster arm device provided by Embodiment 1. As shown in FIGS. 2, 3 and 4, the tire disassembly and assembly machine includes an upright 7 and a tire disassembly and assembly booster arm device. The tire disassembly and assembly booster arm device is installed on the upright 7, the upright 7 is installed on a main machine box, and a disassembly and assembly head 72 is also installed on the upright. In this embodiment, the structure and use method of the tire disassembly and assembly booster arm device are preferably the same as those of the tire disassembly and assembly booster arm device provided in Preferred Embodiment 1, and details are not described herein again. The disassembly and assembly head 72 is fixed on the upright 7 by means of relevant components; moreover, the disassembly and assembly head 72 in this embodiment and a connection relationship between the disassembly and assembly head 72 and the upright 7 may be routinely set by means of the prior art, and details are not described herein again.

It should be noted that the polished shaft in the present invention is not limited to be fixed to two side of the upright by means of an upper shaft base and a lower shaft base. Other optical axis mounting methods capable of mounting an optical axis and enabling easy disassembly can be adaptively applied to the present invention. Correspondingly, the first polished shaft 1 and the second polished shaft 2 are not limited to being symmetrically set at 180°, and a relative relationship of the first polished shaft 1 and the second polished shaft 2 can be flexibly set according to actual requirements. In addition, the first tire pressing arm 5 and the second tire pressing arm 6 of the present invention are not limited to be installed on the upright as a polished shaft and a sliding frame. Other devices capable of achieving the guiding action of the first pressure arm and the second pressure arm can be adaptively applied to the present invention. Finally, the first tire pressing arm 5 of the present invention is not limited to a two-section arm; correspondingly, the second tire pressing arm 6 is not limited to a single-arm structure and can be flexibly adjusted according to actual requirements of disassembling and assembling a tire.

The principles and certain preferred embodiments of the present invention have been described by specific examples in the present specification. The description of the above embodiments is only for facilitating understanding of the method of the present invention and its core idea; meanwhile, for those of ordinary skill in the art, the idea of the invention will vary in the specific embodiments and application scope. In conclusion, the content of the specification should not be understood as limiting the invention.

PARTS LIST

1 First polished shaft
2 Second polished shaft
3 First sliding frame
4 Second sliding frame
5 First tire pressing arm
6 Second tire pressing arm
7 Upright
8 Air cylinder
9 Sliding frame connecting frame
10 Pneumatic valve switch
11 First upper shaft base
12 First lower shaft base
21 Second upper shaft base
22 Second lower shaft base
30 Wheel
41 Adjustment board
42 Positioning bolt
43 Baffle
51 Front tire pressing arm
52 Rear tire pressing rotation arm
53 Tire pressing module
61 Tire pressing roller
71 Air cylinder hanging frame
72 Disassembly and assembly head
81 Piston rod
301 Rubber tire
302 Hub

What is claimed is:

1. A tire disassembly and assembly machine comprising:
an upright;
a first tire pressing arm and a second tire pressing arm;
a first polished shaft and a second polished shaft are symmetrically arranged on two sides of the upright;
an air cylinder hanging frame is installed on a top surface of the upright, and an air cylinder is suspended on the air cylinder hanging frame;
one end of a piston rod of the air cylinder is connected to a sliding frame connecting frame;
a first sliding frame is connected to the first polished shaft in a sliding mode;
the front end of the first sliding frame is hinged to the first tire pressing arm, and the rear end of the first sliding frame is connected to one side of the sliding frame connecting frame;
a second sliding frame is connected to the second polished shaft in a sliding mode;
the front end of the second sliding frame is hinged to the second tire pressing arm; and
the rear end of the second sliding frame is hinged to the other side of the sliding frame connecting frame.

2. The tire disassembly and assembly machine according to claim 1, wherein the first tire pressing arm comprises a front tire pressing arm and a rear tire pressing rotation arm; the rear end of the rear tire pressing rotation arm is hinged to the front end of the first sliding frame, the front end of the rear tire pressing rotation arm is hinged to the rear end of the front tire pressing arm, and a tire pressing module is installed on the front end of the front tire pressing arm.

3. The tire disassembly and assembly machine according to claim 2, wherein the second tire pressing arm is of a single-arm structure, a pneumatic valve switch is installed on one side of the second tire pressing arm, and the pneumatic valve switch controls movement of the piston rod.

4. The tire disassembly and assembly machine according to claim 3, wherein the rear end of the second tire pressing arm is hinged to the front end of the second sliding frame; an adjustment board is provided on the second sliding frame, and a positioning bolt is connected inside the adjustment board in a threaded manner; the positioning bolt is rotated, and one end of the positioning bolt contacts a baffle fixed on the second tire pressing arm and pushes the second tire pressing arm to rotate; and a tire pressing roller is provided on the front end of the second tire pressing arm.

5. The tire disassembly and assembly machine according to claim 1, wherein a first upper shaft base and a first lower shaft base are provided on an outer side wall of the upright; the top end of the first polished shaft is connected to the first upper shaft base in a detachable manner; the bottom end of the first polished shaft is connected to the first lower shaft base in a detachable manner; and an axis of the first polished shaft is parallel to that of the upright.

6. The tire disassembly and assembly machine according to claim 5, wherein a second upper shaft base and a second lower shaft base are also provided on the outer side wall of the upright; the top end of the second polished shaft is connected to the second upper shaft base in a detachable manner, the bottom end of the second polished shaft is connected to the second lower shaft base in a detachable manner, and an axis of the second polished shaft is parallel to that of the upright.

7. The tire disassembly and assembly machine according to claim 6, wherein a length of the first polished shaft is equal to that of the second polished shaft, and the longitudinal axis of the first polished shaft, the longitudinal axis of the second polished shaft, and the longitudinal axis of the upright are on a same plane.

8. The tire disassembly and assembly machine according to claim 7, wherein the first upper shaft base, the first lower shaft base, the second upper shaft base, and the second lower shaft base are integrally formed with the upright.

9. The tire disassembly and assembly machine according to claim 1, wherein a disassembly and assembly head is also installed on the upright.

10. The tire disassembly and assembly machine according to claim 2, wherein a disassembly and assembly head is also installed on the upright.

11. The tire disassembly and assembly machine according to claim 3, wherein a disassembly and assembly head is also installed on the upright.

12. The tire disassembly and assembly machine according to claim 4, wherein a disassembly and assembly head is also installed on the upright.

13. The tire disassembly and assembly machine according to claim 5, wherein a disassembly and assembly head is also installed on the upright.

14. The tire disassembly and assembly machine according to claim 6, wherein a disassembly and assembly head is also installed on the upright.

15. The tire disassembly and assembly machine according to claim 7, wherein a disassembly and assembly head is also installed on the upright.

16. The tire disassembly and assembly machine according to claim 8, wherein a disassembly and assembly head is also installed on the upright.

\* \* \* \* \*